Patented Mar. 25, 1952

2,590,794

UNITED STATES PATENT OFFICE 2,590,794

STABLE LITHIUM HYPOCHLORITE COMPOSITION

Homer L. Robson, Lewiston, N. Y., assignor to Mathieson Chemical Corporation, a corporation of Virginia No Drawing. Application January 4, 1950, Serial No. 136,855

2 Claims. (Cl. 252—187)

My invention relates to the production of lithium hypochlorite compositions in a stable useful form by addition of anhydrous lithium chloride.

It has always been an aim in compounding hypochlorite compositions to provide a solid, stable composition which will give, when dissolved in hard water either in the presence or absence of soap, water conditioning agents such as the polyphosphates and/or alkalies, e. g., soda ash, borax or sodium phosphate, a clear solution without requiring filtration or settling. A stable, solid sodium hypochlorite would meet these requirements but, to the best of my knowledge, it has been found impossible to prepare solid sodium hypochlorite in a stable form without the addition of other compounds.

Lithium hypochlorite can be prepared so as to have a satisfactory stability provided it is maintained in substantially anhydrous condition. While lithium soaps and other lithium salts are precipitated from aqueous solution above certain limits, nevertheless lithium hypochlorite is suitable for use in many hard waters. With sequestering or threshold amounts of polyphosphates the insoluble lithium compounds are easily held in solution. Although calcium hypochlorite has been considered the most satisfactory solid hypochlorite up to now, lithium hypochlorite possesses some advantages over it in these respects.

Anhydrous lithium hypochlorite alone is much more stable than the lithium hypochlorite monohydrate commonly known to the art. However, the manufacture of substantially anhydrous lithium hypochlorite compositions without substantial decomposition during the drying process is very difficult to carry out even in the laboratory. It is possible to partially dehydrate lithium hypochlorite and to reduce the water content until about half of the lithium hypochlorite is converted into the anhydrous condition. But to proceed further commercially is not ordinarily feasible because of the high vacuum and long time required to effect the dehydration. Under the best conditions unavoidable decomposition occurs to a severe extent.

On the other hand, various desiccants have been added to lithium hypochlorite monohydrate or to partially dehydrated lithium hypochlorite compositions with some success. Most of the desiccants which are able to complete the dehydration to a satisfactory degree are alkaline materials such as sodium oxide, anhydrous potassium carbonate and the like. However, these alkaline desiccants may cause a precipitation of calcium and magnesium from some hard waters. Furthermore, in many sanitizing operations it is important to maintain a low pH which is impossible with these alkaline desiccants. For many purposes, therefore, the addition of alkali is undesirable and a neutral or substantially neutral desiccant effective to maintain the lithium hypochlorite in substantially anhydrous condition has long been sought.

It is well known that calcium chloride contributes to the instability of calcium hypochlorite and, as a result, extensive efforts have been made in manufacturing this hypochlorite to avoid obtaining a product contaminated with calcium chloride. Likewise, drying lithium hypochlorite compositions in the present of lithium chloride slows up the drying process and increases the decomposition.

Surprisingly, I have now found that lithium hypochlorite compositions of improved stability are produced if anhydrous lithium chloride is added to lithium hypochlorite compositions containing partially hydrated lithium hypochlorite and limited quantities of other hydrates the amount of lithium chloride approximating at least 10% by weight on the hypochlorite. Advantageously, these compositions are finely divided or powdered and contain from about 10 to 25% of anhydrous lithium chloride on the weight of the hypochlorite. Suitable inert diluents may be compounded into the lithium hypochlorite compositions if desired.

In accordance with my invention, I add at least 10% by weight of anhydrous lithium chloride to lithium hypochlorite and mix the two together. To facilitate an intimate and thorough admixture, the compounds are advantageously finely divided prior to compounding and should be kept in this state to insure maximum utility for the final product. In the preparation of lithium hypochlorite some decomposition usually occurs so that these compositions may contain minor amounts of lithium chloride formed during this preparation and/or drying. For example, from 2 to 10% of lithium chloride may be present in the lithium hypochlorite. But this lithium chloride is usually present in the form of lithium chloride monohydrate and as mentioned above I have found that it actually contributes to decomposition during the drying. Since part of the added anhydrous lithium chloride is converted to the lithium chloride monohydrate, I have found that it is essential to add sufficient anhydrous lithium chloride so that the final composition contains excess anhydrous lithium chloride, above any lithium chloride monohydrate formed in the preparation of the lithium hypochlorite and by the addition of the anhydrous lithium chloride. As a result, I have found that adding less than 10% of the chloride is ordinarily insufficient to effectively desiccate. It is important to add sufficient anhydrous lithium chloride to combine with all hydrate water present in the composition, including that of the lithium hypochlorite and that remaining in any other hygroscopic materials added or to be added to the composition. The addition of more than 25%, however, is ordinarily unnecessary and adds needlessly to the cost of preparation.

The compositions of my invention may also contain inert, innocuous diluents such as sodium or potassium chlorides. In fact, these compositions are eminently suitable for further compounding with polyphosphates, synthetic organic detergents and other compatible ingredients.

Dissolved in water, the compositions of my invention yield solutions of high disinfecting efficiency which may be employed, for example, in the disinfection and cleansing of pipe lines, pasteurizers, coolers and containers in milk and other food processing plants, of kitchen utensils, dishes and glassware in food and drink-dispensing establishments.

The following examples are intended to illustrate more clearly the preparation of lithium hypochlorite compositions in accordance with my invention. In the examples, the use of vented containers is mentioned but I have since found that the decomposition mechanism of lithium hypochlorite does not involve substantial evolution of gases so that vented containers are unnecessary.

*Example I*

A finely powdered lithium hypochlorite composition, having the following composition by weight in the untreated state:

|  | Per cent |
|---|---|
| Available chlorine | 33.7 |
| Lithium hypochlorite | 27.8 |
| Lithium chloride | 5.7 |
| Sodium chloride | 9.4 |
| Sodium sulfate | 44.9 |
| Water | 4.8 |
| Other inorganic salts | 7.4 | was stored in a closed but vented glass container at 30° C. A sample of the untreated lithium hypochlorite composition taken from the container at the beginning of the storage period and analyzed had 30.22% of available chlorine. However, after 217 days of storage analysis showed that there was no chlorine available, a loss of 100%.

The finely powered untreated lithium hypochlorite composition as identified above was then intimately admixed with finely powdered anhydrous lithium chloride and sodium chloride, the latter as an inert diluent, so as to have the following composition by weight:

|  | Per cent |
|---|---|
| Lithium hypochlorite composition | 33 |
| Anhydrous lithium chloride | 11 |
| Sodium chloride | 56 |

As before, this composition was stored in a closed but vented glass container at 30° C. A sample of the stabilized lithium hypochlorite composition taken from the container at the beginning of the storage period and analyzed revealed that it had 11.29% of available chlorine. After 217 days of storage, there was no loss whatsoever of available chlorine, analysis showing 11.59% was available.

Another sample of the finely divided untreated lithium hypochlorite composition as identified above was intimately admixed with finely powdered anhydrous lithium chloride and sodium chloride so as to have the following composition by weight:

|  | Per cent |
|---|---|
| Lithium hypochlorite composition | 33 |
| Anhydrous lithium chloride | 22 |
| Sodium chloride | 45 |

This composition was likewise stored in a closed but vented glass container at 30° C. A sample of the composition taken from the container at the beginning of the storage period showed that it had about 10.35% of chlorine available initially. After 217 days of storage there was no loss of available chlorine, analysis showing 10.52% being available.

*Example II*

Finely powdered lithium hypochlorite, untreated having the following composition by weight:

|  | Per cent |
|---|---|
| Available chlorine | 34.2 |
| Lithium hypochlorite | 28.2 |
| Lithium chloride | 4.5 |
| Sodium chloride | 9.5 |
| Sodium sulfate | 40.7 |
| Water | 5.0 |
| Other inorganic salts | 12.1 | was stored in closed but vented glass containers at temperatures of 30° C. and 55° C. A sample of the untreated lithium hypochlorite composition taken from each container at the beginning of the storage period showed that there was about 30.89% of available chlorine present. After storage at 30° C. for 217 days the untreated lithium hypochlorite composition as identified above had no available chlorine, a loss of 100%. After only 10 days of storage at 55° C. analysis showed that there was 0.48% of available chlorine, or that 99.0% had been lost in this short period of time.

The finely powdered untreated lithium hypochlorite composition as identified above was then intimately admixed with finely powdered anhydrous lithium chloride and sodium chloride so as to have the following composition by weight:

|  | Per cent |
|---|---|
| Lithium hypochlorite composition | 33 |
| Anhydrous lithium chloride | 11 |
| Sodium chloride | 56 |

At the beginning of a storage period in a closed but vented container at 30° C. this composition had about 10.47% of available chlorine. After 217 days of storage, analysis revealed that the available chlorine present was 9.01%, a loss of 13.9%.

The same untreated lithium hypochlorite composition was admixed in different proportions with anhydrous lithium chloride and sodium chloride by weight as follows:

|  | Per cent |
|---|---|
| Lithium hypochlorite composition | 33 |
| Anhydrous lithium chloride | 22 |
| Sodium chloride | 45 |

At the beginning of a storage period at 55° C. there was 10.40% available chlorine. After 6 weeks the available chlorine content was analyzed to be 8.25%, which indicated a loss of 20.7%. At the beginning of a period of storage at 30° C. a similar sample analyzed 10.81% of available chlorine. After 217 days of storage, analysis showed the percentage of available chlorine to be 9.59%, a loss of about 11.3%.

*Example III*

Finely powdered lithium hypochlorite, untreated, having the following composition by weight:

| | Per cent |
|---|---|
| Available chlorine | 32.2 |
| Lithium hypochlorite | 26.5 |
| Lithium chloride | 7.6 |
| Sodium chloride | 8.9 |
| Sodium sulfate | 43.5 |
| Water | 10.0 |
| Other inorganic salts | 3.5 | was stored in closed but vented glass containers at temperatures of 30° C. and 55° C. A sample of the untreated lithium hypochlorite taken from the containers at the beginning of the storage period showed that there was about 29.68% of available chlorine initially. After 6 weeks of storage at 55° C., analysis showed that there was 2.14% of available chlorine, or that a loss of about 93.0% had occurred. When the same untreated lithium hypochlorite composition was stored for 217 days at 30° C., there was 4.78% of available chlorine or a loss of about 84.3% had occurred.

The finely powdered untreated lithium hypochlorite as identified above was then intimately admixed with finely powdered anhydrous lithium chloride and sodium chloride so as to produce the following composition by weight:

| | Per cent |
|---|---|
| Lithium hypochlorite composition | 33 |
| Anhydrous lithium chloride | 11 |
| Sodium chloride | 56 |

This composition was stored in a similar glass container at 55° C. A sample of the composition taken from the container at the beginning of the storage period analyzed about 11.00% of available chlorine. After 6 weeks of storage, analysis showed there was 7.94% of available chlorine, a loss of about 27.8%. A similar sample was then stored at 30% C. for 217 days. The initial available chlorine content of a sample from storage at 30° C. was about 10.12% and at the end of the period analyzed as 8.60%. This amounted to a loss of about 15.0%.

The untreated lithium hypochlorite as identified above was then admixed with anhydrous lithium chloride and sodium chloride to form the following composition by weight:

| | Per cent |
|---|---|
| Lithium hypochlorite composition | 33 |
| Anhydrous lithium chloride | 22 |
| Sodium chloride | 45 |

This composition was then stored in a vented glass container for 217 days at 30° C. Initially the available chlorine content from the storage sample at 30° C. was about 10.31% while at the end of the period it had been reduced to 8.98%, a loss of about 12.9%.

These examples are intended to show that the process and the improved compositions according to my invention yield generally acceptable commercial products comprising anhydrous lithium hypochlorite. Considering the elevated temperatures exemplified in the preceding examples, the compositions are very stable. Generally speaking, if the loss of available chlorine does not exceed about 10%, in 6 months at ordinary temperatures, the composition is considered satisfactorily stable and commercially useful. The untreated lithium hypochlorite compositions of the examples were prepared by rotary drum vacuum drying using intercrystallized sodium sulfate to assist in maintaining the material on the surface of the drums during drying. The procedure is disclosed and the subject matter claimed in my application Serial No. 136,856, filed January 4, 1950. The proportion of hydrate water remaining in these products is ordinarily quite low, but other partially dried, commercially prepared lithium hypochlorite compositions may be used. The sodium chloride of the examples is a diluent designed to reduce the available chlorine content of the finished compositions to customary commercial levels. As may be seen, it may comprise approximately half of the mixture.

I claim:

1. A dry, stable lithium hypochlorite composition containing lithium hypochlorite in intimate admixture with at least about 10% of added anhydrous lithium chloride by weight on the lithium hypochlorite and in excess of that required to combine with all hydrate water present in the composition.

2. In the preparation of dry stable lithium hypochlorite compositions, the improvement which comprises intimately admixing with the lithium hypochlorite a quantity of anhydrous lithium chloride approximating at least 10% by weight on the lithium hypochlorite and in excess of that required to combine with all hydrate water present in the composition.

HOMER L. ROBSON.

REFERENCES CITED

The following references are of record in the file of this patent:

UNITED STATES PATENTS

| Number | Name | Date |
|---|---|---|
| 2,356,820 | Cady | Aug. 29, 1944 |
| 2,384,629 | Laue | Sept. 11, 1945 |

FOREIGN PATENTS

| Number | Country | Date |
|---|---|---|
| 581,945 | Great Britain | Oct. 30, 1946 |